United States Patent
Saiki et al.

(10) Patent No.: US 6,838,131 B2
(45) Date of Patent: Jan. 4, 2005

(54) MULTILAYERED STRUCTURE RESIN MOLDED PRODUCT AND METHOD OF MANUFACTURING MULTILAYERED STRUCTURE RESIN MOLDED PRODUCT

(75) Inventors: Daishi Saiki, Tokyo (JP); Hirohide Matsuhisa, Kanagawa (JP); Naohisa Kumagai, Ibaraki (JP); Izumi Uraki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/897,014

(22) Filed: Jul. 3, 2001

(65) Prior Publication Data

US 2002/0015841 A1 Feb. 7, 2002

(30) Foreign Application Priority Data

Jul. 14, 2000 (JP) ........................................ 2000-214388
Jun. 1, 2001 (JP) ........................................ 2001-167194

(51) Int. Cl.$^7$ .............................. B32B 3/02; B32B 3/30; B60R 13/00
(52) U.S. Cl. ........................... 428/31; 428/99; 428/100; 428/172; 428/213; 428/903.3
(58) Field of Search .......................... 428/172, 99, 100, 428/31, 213, 332, 411.1, 903.3

(56) References Cited

U.S. PATENT DOCUMENTS

| 4,023,896 A | * | 5/1977 | Koch .......................... 399/190 |
| 4,448,608 A | * | 5/1984 | Jenkins et al. .............. 106/428 |
| 4,493,806 A | * | 1/1985 | Hatzikelis et al. ............. 264/28 |
| 4,546,022 A | * | 10/1985 | Madonia et al. .............. 428/31 |
| 4,552,780 A | * | 11/1985 | Abe et al. ...................... 427/8 |
| 4,715,802 A | | 12/1987 | Arai ........................... 425/130 |
| 5,508,060 A | * | 4/1996 | Perman et al. ............. 427/2.14 |
| 5,566,889 A | * | 10/1996 | Preiss .......................... 241/19 |
| 5,645,786 A | | 7/1997 | Okada et al. ................ 264/255 |
| 5,702,148 A | * | 12/1997 | Vaughan et al. ......... 296/146.9 |
| 5,792,397 A | | 8/1998 | Ritchey ....................... 264/40.7 |
| 5,851,624 A | * | 12/1998 | Ang et al. ..................... 428/68 |
| 6,068,896 A | * | 5/2000 | Manabe et al. ................ 428/31 |
| 6,248,412 B1 | * | 6/2001 | Kawashima et al. ........... 428/31 |

FOREIGN PATENT DOCUMENTS

| JP | 5-147036 | 6/1993 |
| JP | 5-278068 | 10/1993 |
| JP | 5-301222 | 11/1993 |
| JP | 7-171859 | 7/1995 |
| JP | 8-224754 | 9/1996 |
| JP | 9-52256 | 2/1997 |
| JP | 10-202694 | 8/1998 |
| JP | 3017052 | 12/1999 |
| JP | 3031357 | 2/2000 |

OTHER PUBLICATIONS

C. Jaroschek, "New Ways with the Sandwich Method of Injection Moulding," 83(7) *Kunstsoff* 513–521 (Jul., 1993).
"Bi–Injection: Une Technique Oubliée," 43(10) *Plastiques Modernes et Elastomeres* 64–66 (Dec. 1991).

* cited by examiner

Primary Examiner—Ramsey Zacharia
(74) Attorney, Agent, or Firm—Fitzpatrick, Cella, Harper & Scinto

(57) ABSTRACT

It is an object of this invention to provide a multilayered structure molded product formable by reusing a resin molded product. To achieve this object, a multilayered structure resin molded product including a core layer and a skin layer is molded using a pulverized resin material, which is formed by pulverizing a molded product molded from a thermoplastic resin material, as a resin material for forming the core layer, and a virgin material as a resin material for forming the skin layer.

10 Claims, 15 Drawing Sheets

FIG. 7
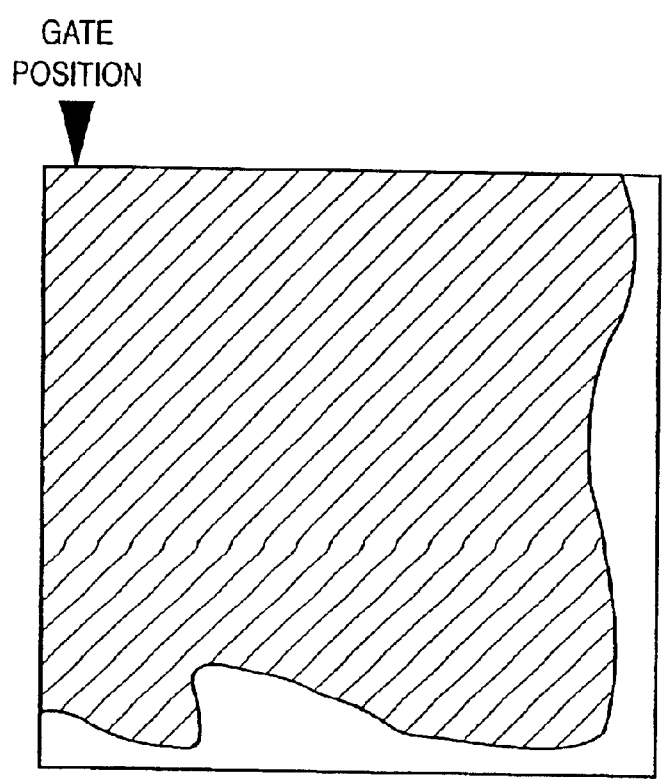
CORE LAYER RESIN FILLED PORTION
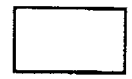
SKIN LAYER RESIN ALONE
FIRST EMBODIMENT F I G. 12
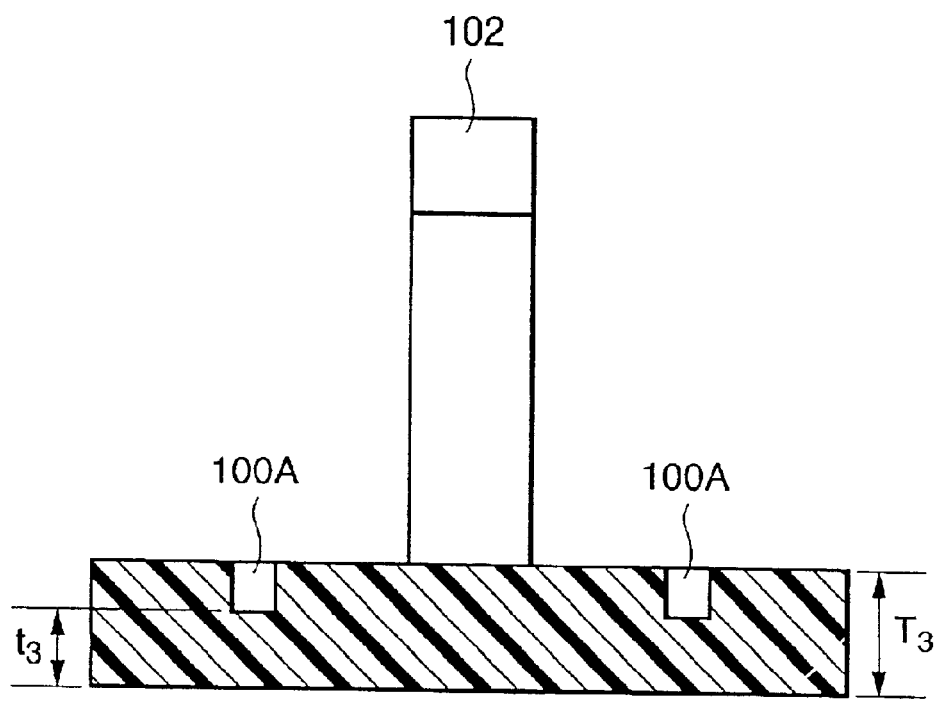

F I G. 15
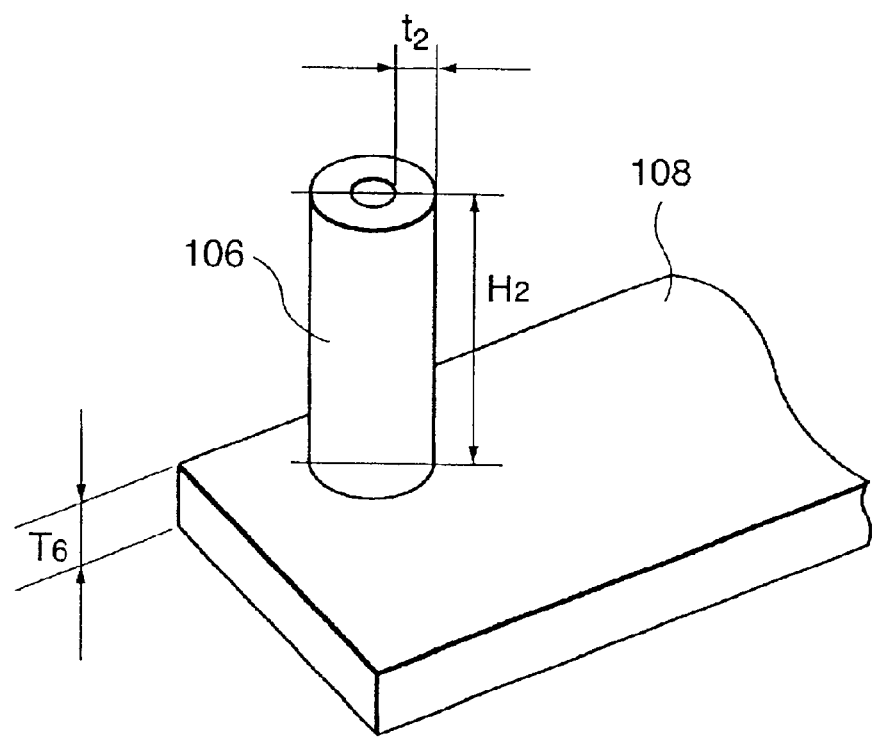

MULTILAYERED STRUCTURE RESIN MOLDED PRODUCT AND METHOD OF MANUFACTURING MULTILAYERED STRUCTURE RESIN MOLDED PRODUCT

FIELD OF THE INVENTION

The present invention relates to a resin molded product having a multilayered molded structure containing a resin material for forming a core layer and a resin material for forming a skin layer.

More particularly, the present invention relates to a molded product having a so-called sandwich structure in which a molded portion of the core layer resin material is surrounded by a molded portion of the skin layer resin material.

Furthermore, the present invention relates to a resin molded product formed by reusing a resin material which is a resin molded product made of a thermoplastic resin material.

Also, the present invention relates to a technique of pulverizing a molded product of the thermoplastic resin material described above, and using the pulverized resin material as a resin material of injection molding.

Additionally, the present invention relates to a resin molded product manufacturing method of forming a multilayered structure resin molded product by injection-molding a resin material for forming a core layer and a resin material for forming a skin layer, wherein a pulverized resin material obtained by pulverizing a thermoplastic resin molded product is used as the resin material for forming the core layer.

Moreover, the present invention relates to a technique of recycling plastic resin materials used in, e.g., image forming apparatuses such as copying machines and printers, information communication apparatuses such as facsimile apparatuses and computers, and household electric appliances.

BACKGROUND OF THE INVENTION

So-called sandwich structure injection molding is one of injection molding techniques. In this injection molding, two types of resin materials are injected into a mold cavity to mold a multilayered structure containing a resin molded portion for forming a core layer and a resin molded portion for forming a skin layer.

Many prior art references pertaining to this sandwich molding are available, and they are classified into International Patent Classification IPC B29C 45/16. Examples are Japanese Patent No. 3017052 and Japanese Patent Laid-Open No. 8-224754.

The present invention also relates to a technique of reusing molded plastic materials and resin materials. Examples of prior art references related to the reuse of resin materials are Japanese Patent Laid-Open Nos. 5-301222, 5-147036, and 10-202694.

Japanese Patent No. 3031357 describes an example in which a recycled material is used as a core material of a sandwich molded product and a recycled material is also used as a surface material.

Recently, industrial circles are variously influenced to protect the global environment and effectively use natural resources. Also, attempts to reuse plastic materials and resin materials as petroleum resources have been demanded to be put into practical use.

To meet this demand, development of resin molded product recycling techniques is being extensively made.

In particular, relatively large amounts of a number of large-sized thermoplastic materials are used in various types of electronic apparatuses, e.g., image forming apparatuses such as copying machines and printers, office machines and information communication apparatuses such as facsimile apparatuses and computers, and household electric appliances such as air conditioners, video decks, and audio components.

Thermoplastic materials removed from used products of these apparatuses are inferior in diverse physical properties such as mechanical strength, fire retardance, and external color.

Also, various foreign substances are sticking to the surface to contaminate it.

Accordingly, as a method of recycling these materials, a method has been proposed by which molded products are pulverized, cleaned, and repelletized, and an unused resin material (virgin pellets) and the used resin material are mixed at a predetermined ratio to recover the physical properties.

In this method, however, a deteriorated used resin material is mixed in an unused resin material. Therefore, a manufactured recycled material is inferior to a molded product of a 100% virgin pellet resin material in mechanical strength, fire retardance, and external color.

To solve the environmental problems by effectively using the aforementioned resources and reducing the amount of industrial waste as much as possible, multilayered structure molding, so-called sandwich molding, can be used as one means for using a used resin material as the material of a resin molded product.

That is, this multilayered molded product is obtained by injecting a resin material for forming a core layer and a resin material for forming a skin layer into a mold, thereby forming a resin molded product having a multilayered structure in which the core layer is covered with the skin layer.

The method uses the used resin material described above as the core layer resin material of this multilayered structure.

To increase the resin material recycling ratio by reusing a used resin material as a raw material of the above-mentioned multilayered structure molding, i.e., so-called sandwich molding, the filling ratio of a core layer resin portion as a recycling material is important.

When the filling amount of a core layer structural portion is increased and the skin layer resin material is injected around the core layer structural portion, the core layer resin sometimes overflows from a portion covered with the skin layer portion.

SUMMARY OF THE INVENTION

It is an object of the present invention to provide a molded product which is evenly filled with as large an amount of core layer resin material as possible, and in which this core layer resin material is completely covered with a skin layer resin material, and to provide a method of manufacturing the same.

It is another object of the present invention to provide a manufacturing method which uses a material formed by pulverizing a resin molded product to be reused, thereby avoiding physical property deterioration by the thermal hysteresis of a core layer resin material and achieving a merit of the material cost.

It is still another object of the present invention to prevent a decrease in part strength occurring when a recycled material is used as a core material of sandwich molding (a multilayered molded structure) to solve the above problems.

That is, external members, housings, and mechanical parts as components of image forming apparatuses and information communication apparatuses such as copying machines, printers, and facsimile apparatuses form functional portions such as threaded portions and fitting portions for connecting to other parts, in addition to flat-plate structures.

High mechanical strength of such functional portions must be ensured. However, if a recycled material is used as a core material, deterioration of the physical property values of this recycled material makes it difficult to ensure the functions of these functional portions.

It is still another object of the present invention to ensure high quality when a molded product of an external structural part is formed using a recycled material as a core material of a multilayered structure molded product.

That is, when a recycled material of a color (dark color) having low lightness is used as a core layer and an unused virgin material of a color having high lightness is used as a skin layer on the surface of the core layer, it is necessary to prevent bad influence of the core layer color on the outer appearance.

To achieve the above objects, the present invention proposes a multilayered structure resin molded product comprising a core layer and a skin layer, characterized in that the resin molded product is molded using a pulverized resin material, which is formed by pulverizing a molded product molded from a thermoplastic resin material, as a resin material for forming the core layer, and a virgin material as a resin material for forming the skin layer.

The above invention has a mode of a multilayered structure resin molded product, characterized in that the resin molded product is an external part, housing part, or constituent part of an office apparatus, electric apparatus, or information communication apparatus.

The above invention further has a mode of a multilayered structure resin molded product, characterized in that the resin material for forming the core layer is obtained by pulverizing a resin molded product of an external part, housing part, or constituent part of an office apparatus.

One aspect of the present invention achieves the above objects by a method of manufacturing a multilayered structure resin molded product comprising a core layer and a skin layer, characterized in that molding is performed by setting a viscosity of a resin material for forming the core layer, which is injected into a cavity of a mold for molding the resin molded product, to be lower than that of a resin material for forming the skin layer.

Another aspect of the present invention proposes a method of manufacturing a multilayered structure resin molded product comprising a core layer and a skin layer, characterized in that a pulverized resin material formed by pulverizing a molded product molded from a thermoplastic resin material is used as a resin material for forming the core layer, a virgin material is used as a resin material for forming the skin layer, and molding is performed by setting a resin temperature of the resin material for forming the core layer to be higher than that of the resin material for forming the skin layer.

The present invention proposes a method of manufacturing a multilayered structure resin molded product comprising a core layer and a skin layer, characterized in that molding is performed by setting, during injection, an injection volume per unit time of a resin material for forming the core layer to be larger than that of a resin material for forming the skin layer.

The above invention has a mode of a multilayered structure resin molded product manufacturing method, characterized in that a pulverized resin material obtained by pulverizing a molded product molded from a thermoplastic resin material is used as the resin material for forming the core layer.

Still another aspect of the present invention proposes a method of manufacturing a multilayered structure resin molded product by injecting a resin material for forming a core layer and a resin material for forming a skin layer into a mold, characterized in that a resin material obtained by pulverizing a resin molded product molded from a thermoplastic resin material and setting the size of the pulverized resin material to a predetermined size is used as the resin material for forming the core layer.

The above method is characterized in that the multilayered structure resin molded product is an external part, housing part, and constituent part of an image forming apparatus.

The present invention proposes a mode in which the size of the pulverized resin material to be used as the core layer resin material is set to preferably 10 mm or less and particularly preferably 4 to 10 mm.

Also, the present invention proposes a method of manufacturing a multilayered structure resin molded product by injecting a resin material for forming a core layer and a resin material for forming a skin layer into a mold, characterized in that after a predetermined volume of the resin material for forming the skin layer is injected, a resin material for forming the core layer, which is obtained by pulverizing a molded product of a resin material, and a virgin resin material for forming the skin layer are simultaneously injected, and the virgin resin material for forming the skin layer is injected again.

The present invention has a mode of a multilayered structure resin molded product manufacturing method, characterized in that a material obtained by pulverizing a resin molded product molded from a thermoplastic resin material is used as the core layer resin material.

The pulverized resin material to be used as the resin material for forming the core layer is not heated in a step before the pulverized resin material is melted to be injected into the mold.

Still another aspect of the present invention proposes a multilayered structure resin molded product comprising a core layer and a skin layer, characterized in that a pulverized resin material formed by pulverizing a molded product made of a thermoplastic resin material is used as a resin material for forming the core layer, a virgin material is used as a resin material for forming the skin layer, and the resin material for forming the skin layer is molded using the same type of a resin material as the pulverized resin material.

To solve the problem of the outer appearance as one of the objects described above, still another aspect of the present invention proposes a multilayered structure resin molded product comprising a core layer and a skin layer, characterized in that the resin molded product is attached to an apparatus as an external part of the apparatus, and a thickness of the skin layer from a surface of the apparatus is defined within a range of numerical values by which transmission of the color of the core layer resin material portion is suppressed.

The above invention has a mode of a multilayered structure resin molded produced, characterized in that the thickness of the skin layer of the resin molded product is 0.3 mm or more.

To assure the strength of a functional part of the aforementioned multilayered structure resin molded product, still another aspect of the present invention proposes a multilayered structure resin molded product comprising a core layer and a skin layer, characterized in that a portion of the resin molded product has a mounting portion for mounting a functional part, the whole of the resin molded product has a multilayered structure comprising the core layer and the skin layer, and the functional part mounting portion is made of a skin layer resin material.

When the above resin molded part is to be used as a mechanical structural member, the present invention proposes a multilayered structure resin molded product comprising a core layer and a skin layer, characterized in that a portion of the resin molded product has a mounting portion for mounting another part, the whole of the resin molded product has a multilayered structure comprising the core layer and the skin layer, and the mounting portion is made of a skin layer resin material.

The present invention proposes a mode of a multilayered structure resin molded product, characterized in that the mounting portion is a connecting portion having elasticity.

Furthermore, the present invention proposes a mode of a multilayered structure resin molded product, characterized in that the mounting portion is a screw connecting portion.

A resin material for forming the core layer of the multilayered structure resin molded product is a recycled resin material obtained by pulverizing a resin molded product.

Also, the present invention proposes a method of manufacturing a multilayered structure resin molded product comprising a core layer and a skin layer and having a connecting portion for connecting to another part, characterized in that a small-thickness portion is formed around the connecting portion of the resin molded product.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 7 is a view for explaining the states of the skin layer resin material and core layer resin material in a mold cavity;

FIG. 12 is a sectional view taken along a direction b—b in FIG. 11;

FIG. 15 is a view for explaining still another example.

DETAILED DESCRIPTION OF THE PREFERRED EMBODIMENTS

Preferred embodiments of the present invention will now be described in detail in accordance with the accompanying drawings.

(First Embodiment)

Figure 1:
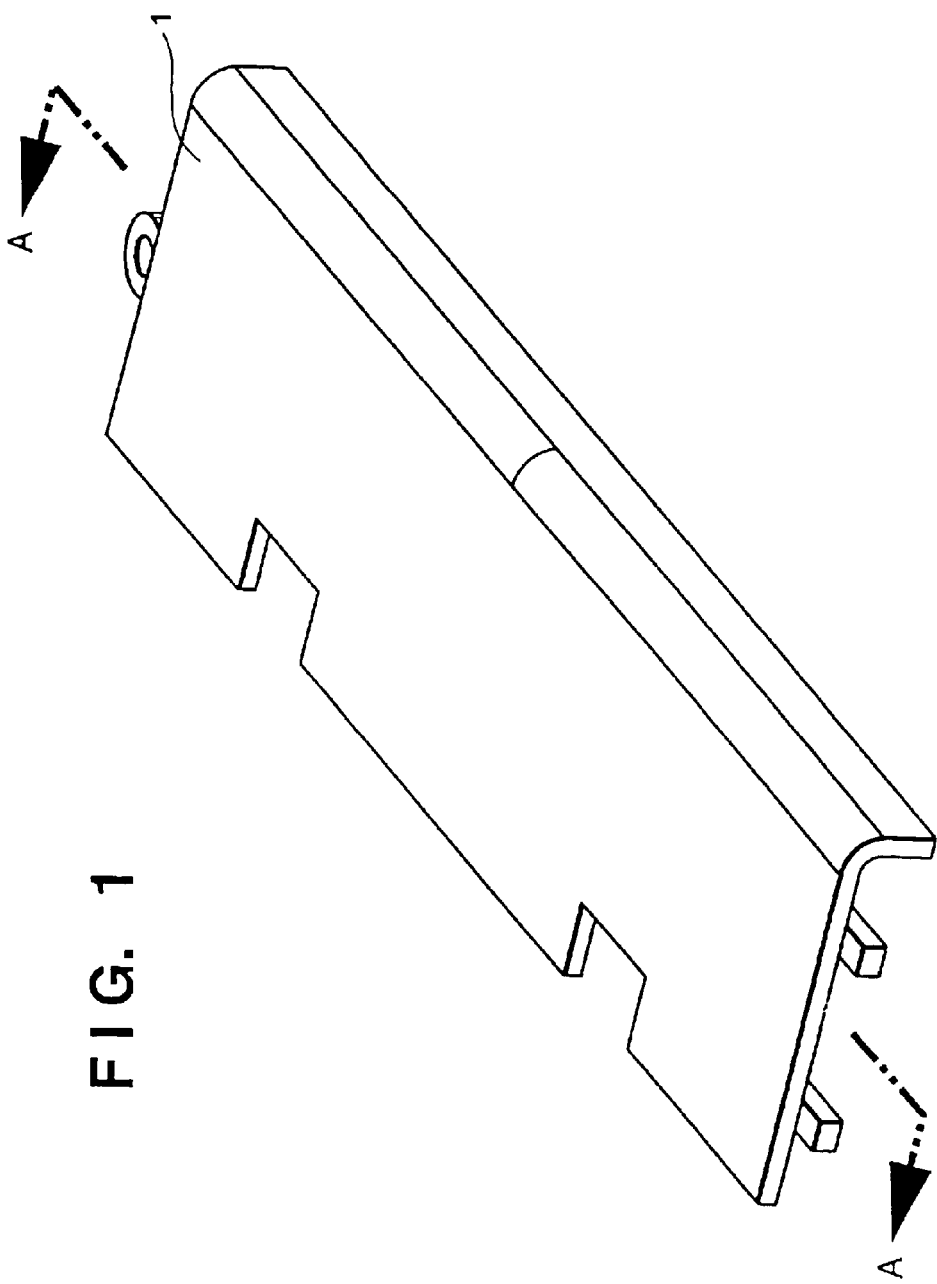
FIG. 1 is a perspective view of a multilayered resin molded product according to the present invention.

FIG. 1 is a perspective view of an external part 1 which is a multilayered molded structure molded product as an object of the present invention.

Figure 2:
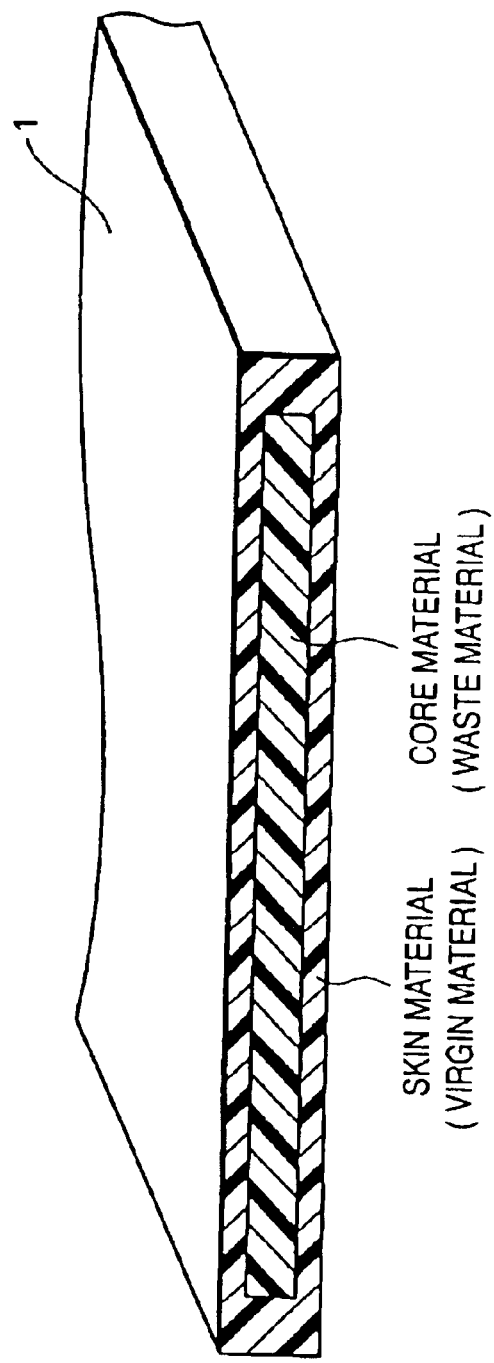
FIG. 2 is a sectional view taken along a direction A—A in FIG. 1.

FIG. 2 is a view for explaining the main parts, taken along a line A—A in FIG. 1.

Figure 3:
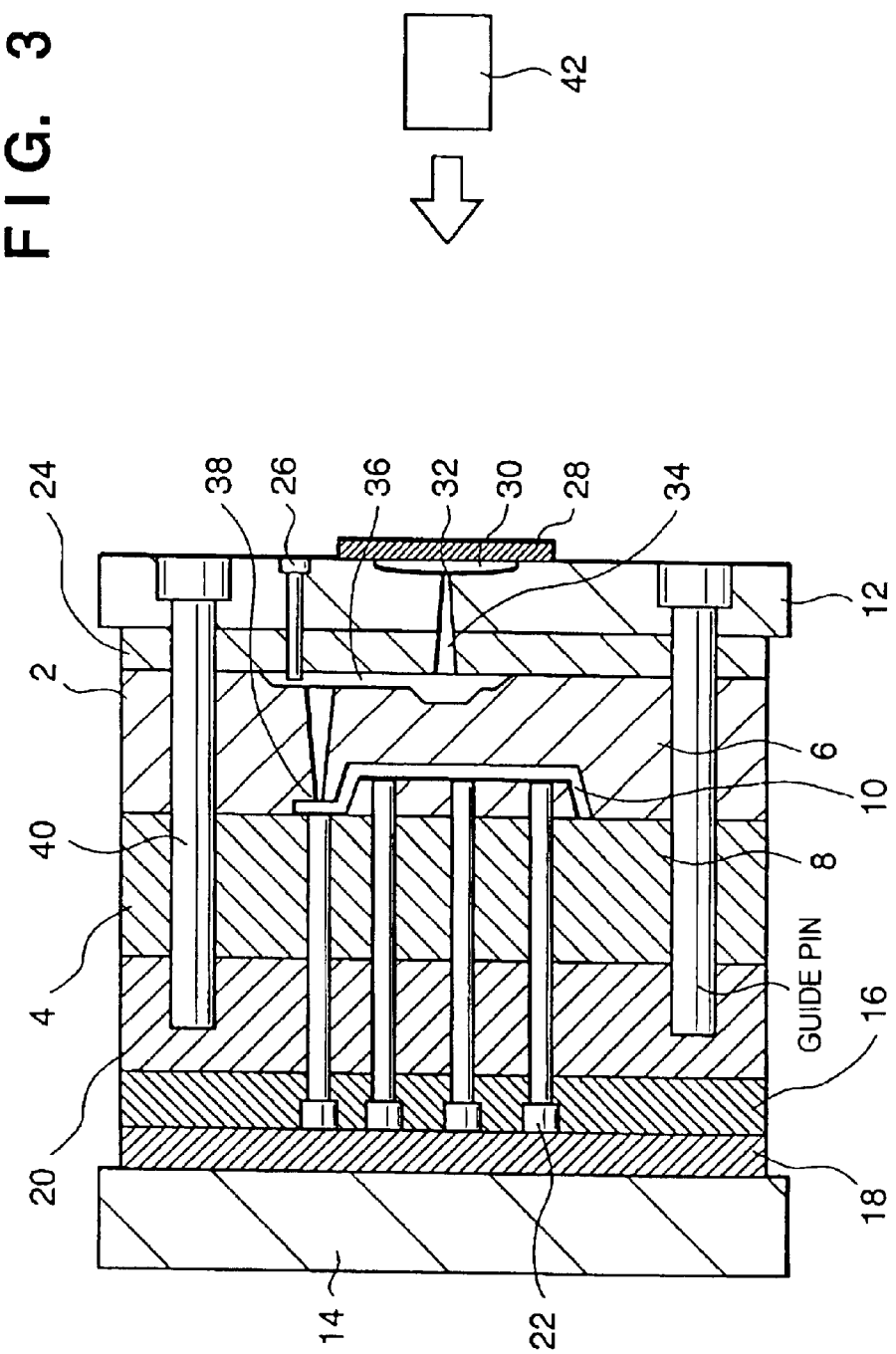
FIG. 3 is a view for explaining the arrangement of the major parts of a molding machine for molding the resin molded product according to the present invention.

FIG. 3 is a view for explaining the main components of a molding machine for injection-molding the multilayered molded structure member 1 shown in FIGS. 1 and 2.

Referring to FIG. 3, reference numeral 2 denotes a retainer plate; 4, a movable retainer plate; 6, a front cavity plate member attached to the retainer plate 2; 8 a rear cavity plate member attached to the movable retainer plate 4; and 10, a cavity representing the shape of a molded product formed between the front cavity plate member 6 and the rear cavity plate member 8.

Reference numeral 12 denotes a front clamping plate; and 14, a rear clamping plate.

Reference numeral 16 denotes a ejector fixing plate; 18, a ejector plate; 20, a spacer block; and 22, an ejector pin.

Reference numeral 24 denotes a spring ejector; 26, a runner lock pin; 28, locating ring; 30, a nozzle receiver for an injection cylinder (not shown); 32, a nozzle; 34, a sprue; 36, a runner; and 38, a gate.

Reference numeral 40 denotes a guide pin.

Reference numeral 42 denotes an injecting means connected to the nozzle to inject a core layer resin material and a skin layer resin material. As this injecting means, it is possible to use devices disclosed in, e.g., Japanese Patent No. 3017052 and Japanese Patent Laid-Open Nos. 8-224754 and 9-52256.

The material of a core layer structural portion which is a raw material of the resin material according to the present invention is a recycled material obtained by collecting the external parts 1, or molded parts of the same resin material as the external parts 1, during the process of disassembling used collected products of, e.g., copying machines and laser printers, and by disassembling, pulverizing, cleaning, and classifying the collected molded parts 1.

An unused virgin resin material is used as the skin layer resin material.

Figure 4:
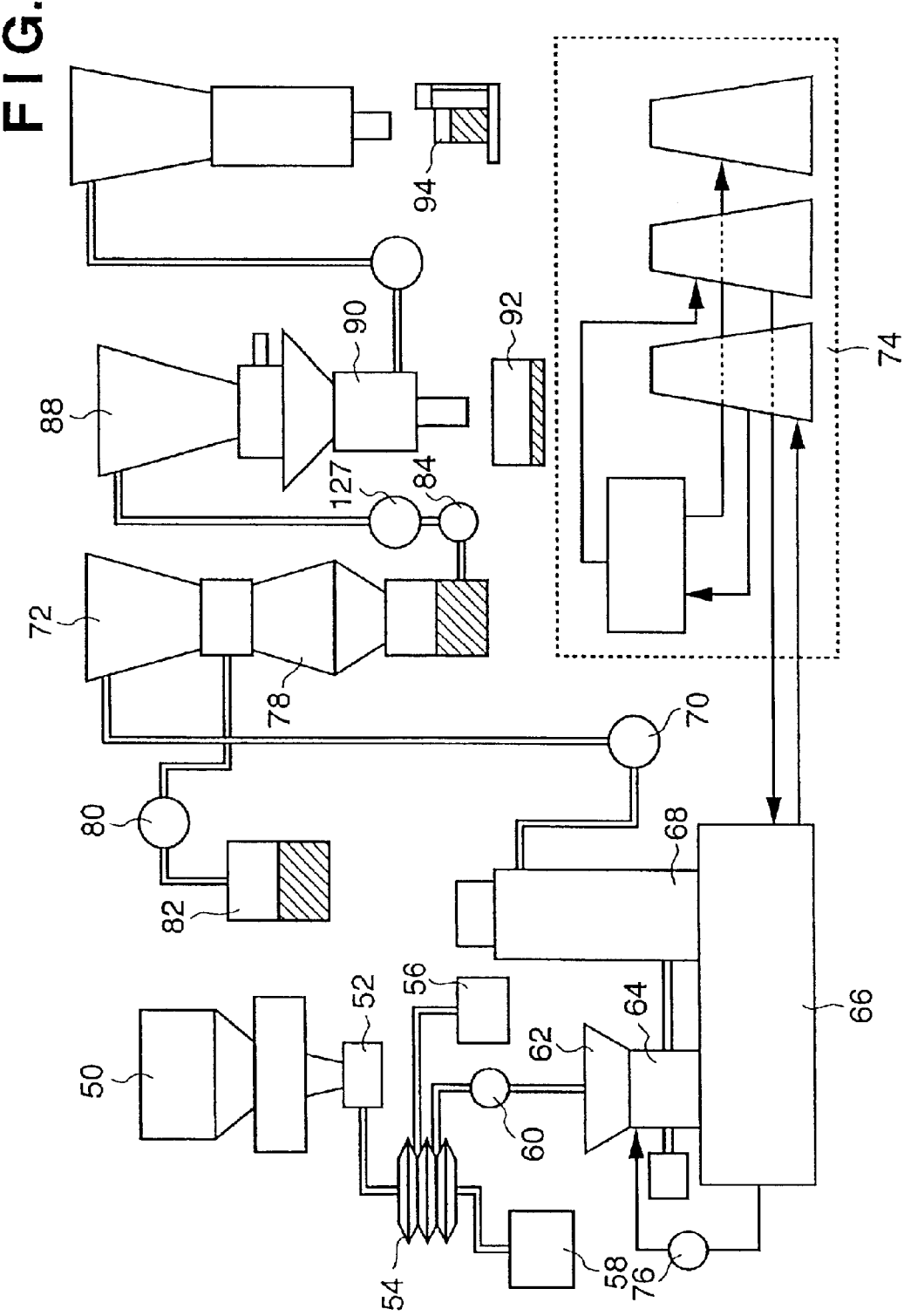
FIG. 4 is a view for explaining the steps of pulverizing a recycled resin material used as a core layer resin material used in the present invention.

FIG. 4 is a view showing the arrangement of a system of recycling the core layer resin material as a raw material of the present invention.

A pulverizer 50 pulverizes the external parts 1 of the collected copying machines and laser printers into a predetermined size.

The resin materials of the external parts 1 include a polycarbonate resin (PC) and an alloy molded resin material of acrylonitrile, butadiene, and styrene (ABS). In this embodiment, the size of pulverization was set to 4 to 10 mm.

The set numerical value range of the pulverization size was defined by taking account of clogging of a hopper of a plasticator or clogging in a convey/supply process when the pulverized raw material of the core layer resin material was supplied to the hopper.

A conveyor apparatus 52 supplies the pulverized material by a predetermined amount at a time to a shaking screen 54.

A collection tank 56 returns an unpulverized material to the pulverizer.

Reference numeral 58 denotes a fine-particle collection tank.

A magnetic selector 60 removes metals from the pulverized material passed through the shaking screen 54.

The material passed through this magnetic selector 60 is supplied to a cleaning machine 66 via a hopper 62 and a feeder 64.

The pulverized resin material cleaned by the cleaning machine 66 is supplied to a cyclone 72 by an air blower 70 via a cleaning/dewatering machine 68.

Reference numeral 74 denotes a cleaning solution density adjusting step; and 76, a circulating device.

The pulverized resin material supplied to the cyclone 72 is classified by an air classification machine 78. Foreign matter having small specific gravity is discharged to a collection tank 82 by a blower 80.

The pulverized resin material thus classified is passed through a magnetic selector 84 and supplied to a stock tank 88 by a blower 127.

After that, metals separated by a metal separator 90 are supplied to a collection tank 92.

The pulverized resin material from which impurities such as metals are removed is collected as a recycled plastic material in a collection vessel 94.

(Explanation of Molding Operation)

The process of manufacturing the multilayered resin molded product according to the present invention will be described below with reference to FIG. 5.

The molding conditions of the first embodiment are as follows. The cavity surface temperature of the front cavity plate member 6 and the rear cavity plate member 8 is set at 60° C. ±1° C. by a heating means (not shown).

The injection temperature of the skin layer resin material is 250° C.

The injection temperature of the core layer resin material is 270° C.

The injection rate of the skin layer resin material is 10 mm/sec.

The injection rate of the core layer resin material is 20 mm/sec.

In the above setting conditions, the injection temperature of the core layer resin material is set to be higher than that of the skin layer resin material, thereby setting the viscosity of the core layer resin material to be lower than that of the skin layer resin material.

The PC+ABS resin material as the skin layer resin material is heated and melted in the first cylinder of the plasticizing means 42 (FIG. 3). Also, the recycled resin material as the core layer resin material, which is pulverized in the processing steps shown in FIG. 4, is heated and melted in the second cylinder.

Figure 5:
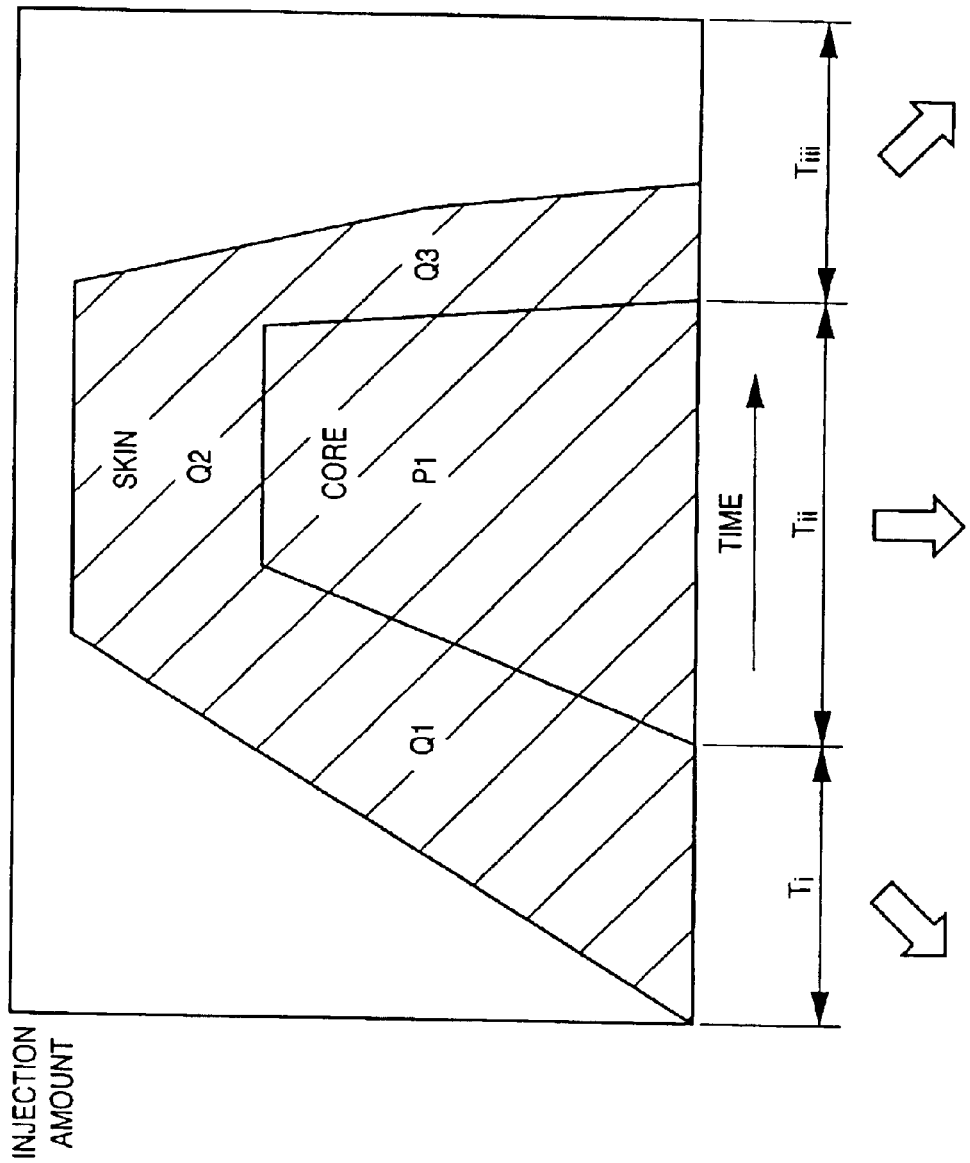
FIG. 5 is a view for explaining the process of manufacturing a multilayered structure resin molded product.

As shown in FIG. 5, in the first injection step, a predetermined resin amount Q1 of the skin layer resin material is injected within a predetermined time $T_i$ from the plasticizing means 42.

Subsequently, in the second injection step, a volume Q2 of the skin layer resin material and a volume P1 of the core layer resin material are simultaneously injected within a predetermined time $T_{ii}$.

In this second injection step, the skin layer resin material previously injected into the cavity in the first injection step is pushed by the skin layer resin material and the core layer resin material injected in the second injection step, and thereby advances in the cavity along the circumference wall of the cavity (FIG. 7).

Following the second injection step, a predetermined amount Q3 of the skin layer resin material is injected within a predetermined time $T_{iii}$ in the third step.

As described earlier, the injection temperature of the skin layer resin material is set to be lower than that of the core layer resin material. Therefore, the core layer resin material injected in the second injection step advances in the cavity while pushing the back side of the skin layer resin material previously injected into the cavity, thereby evenly spreading the skin layer resin material on the cavity surface.

Figure 6:
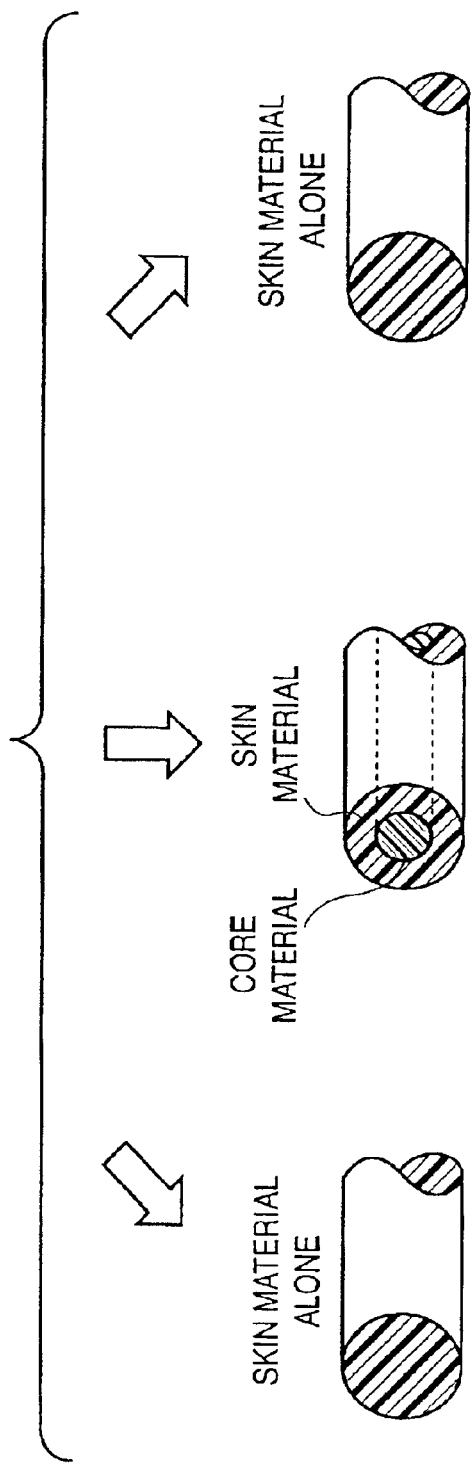
FIG. 6 is a view for explaining the steps of injecting a skin layer resin material and a core layer resin material.

FIG. 6 is a view schematically showing the states of the resin materials injected into the cavity in the individual injection steps. Only the skin layer resin material is injected in the first injection step, and the skin layer resin material and the core layer resin material which is a recycled material are simultaneously injected in the second step. Consequently, as shown in FIG. 6, the skin layer resin material is so injected as to surround the core layer resin material in the cavity.

As described above, in the second injection step the core layer resin material is so injected as to be surrounded by the skin layer resin material. This avoids the core layer resin material from breaking through the skin layer resin material.

FIG. 7 shows a molded product obtained by the above injection operation of this embodiment. That is, FIG. 7 is a sectional view showing the state in which the skin layer resin material and the core layer resin material are injected and filled.

(Second Embodiment)

The second embodiment of the present invention will be described below with reference to FIGS. 8 to 15.

In this embodiment, a functional portion of a resin molded product is formed. This functional portion has a function of connecting to another part.

External members and constituent members of image forming apparatuses such as copying machines, printers, and laser beam printers (LBPs), and information/communication apparatuses such as facsimile apparatuses, computers, communication interfaces, and portable communication apparatuses are often made of molded products of plastic resin materials, in order to achieve high strength and light weights. Attaching portions for connecting to other parts are sometimes formed on these external members and constituent members.

Figure 8:
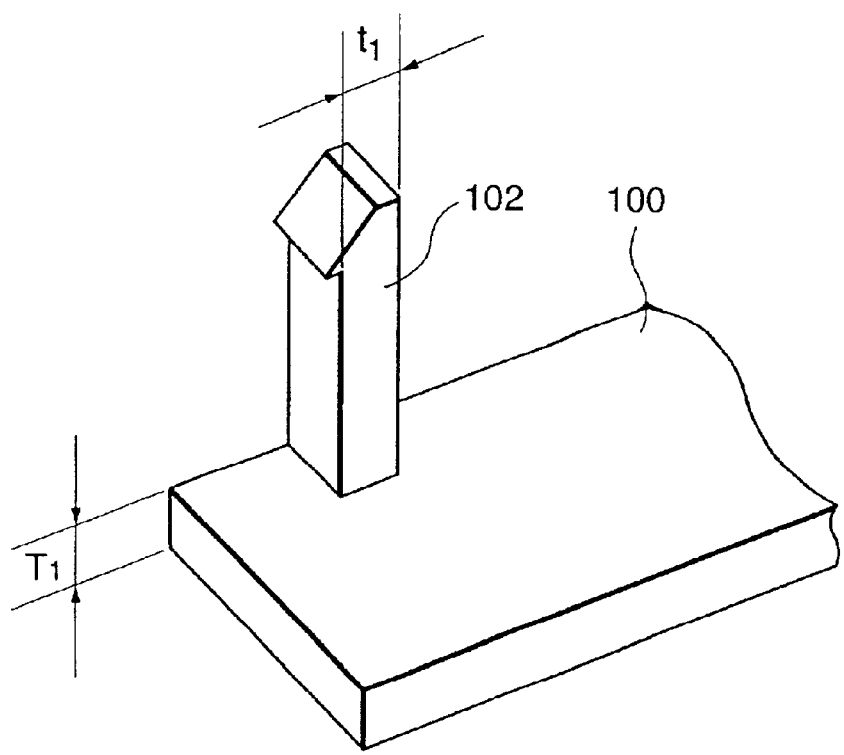
FIG. 8 is a view for explaining a structure in which a functional portion for connecting to another part is formed on the board surface of a multilayered structure resin molded product.
Figure 9:
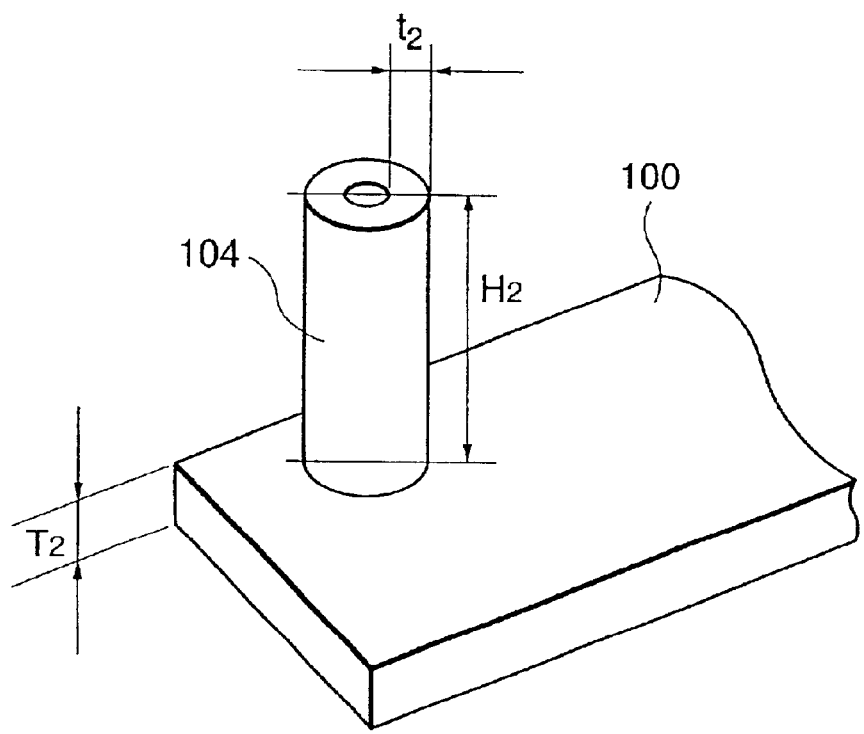
FIG. 9 is a view for explaining a structure for a screw connection.

Examples are an elastic projecting portion (pawl) 102 for a spring connection and a projecting portion 104 for a screw connection, shown in FIGS. 8 and 9, respectively, which are integrally molded from a board 100 of a multilayered structure resin molded product.

These elastic projecting portions 102 and projecting portion 104 are required to have elasticity and toughness to mechanically connect to a connecting member of a counterpart.

As described above, the objects of the present invention are recycling and effective use of resin materials. However, if a recycled raw material obtained by pulverizing resin molded products is used as a core layer resin material, this recycled resin material is inferior to an unused virgin resin material in mechanical characteristics, particularly toughness.

Accordingly, a recycled resin material is inadequate to form a structural member which is a multilayered structure resin molded product as described above having a functional portion for connecting to another member.

Referring to FIG. 8, a thickness t1 of the elastic projecting portion 102 is made smaller than a thickness T1 of the board 100. Hence, only the skin layer resin material-flows into a cavity for forming the elastic projecting portion 102, and inflow of the core layer resin material is prevented. This makes it possible to avoid the influence by deterioration of the toughness of the core layer resin material, caused by a pulverized raw material.

Referring to FIG. 9, a thickness t2 of the projecting portion 104 for a screw connection is made smaller than a thickness T2 of the board 100. Accordingly, the constituent resin material of the projecting portion 104 can be molded only with the skin layer resin material. As a consequence, high toughness and high elasticity of the projecting portion can be ensured.

Figure 10:
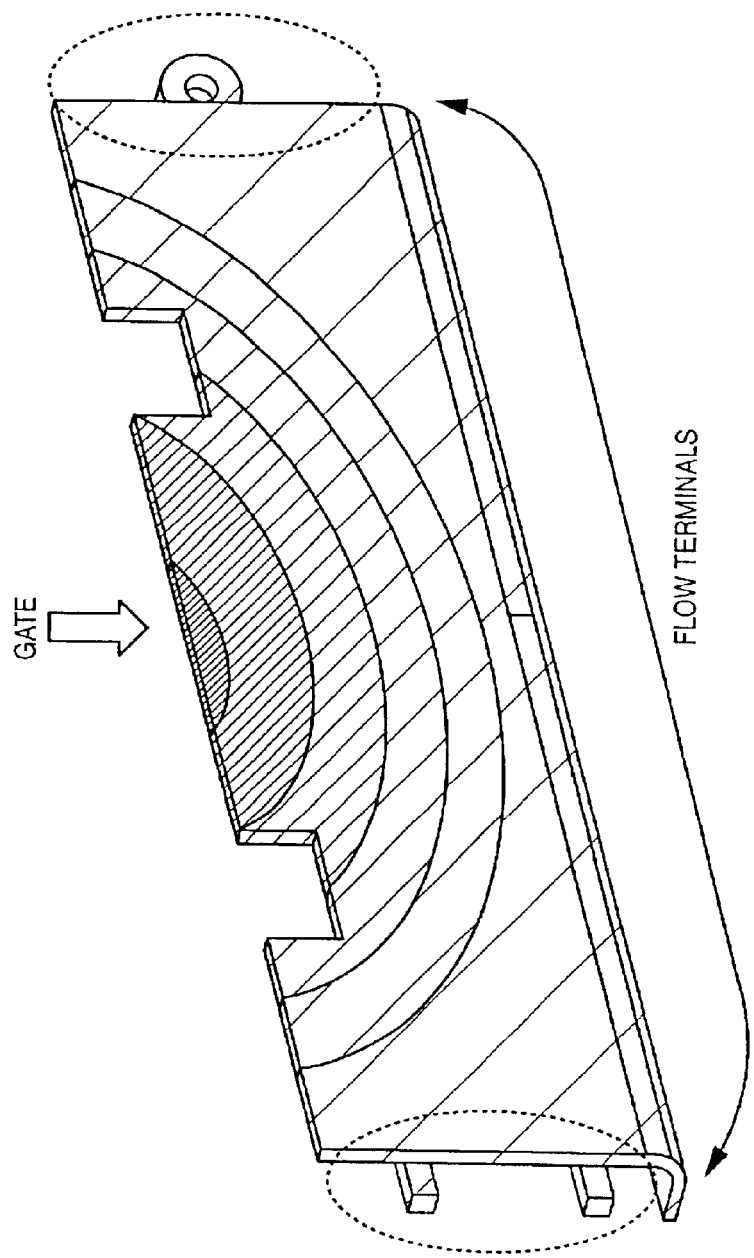
FIG. 10 is a view for explaining the state of a flow of a resin material into a cavity.

FIG. 10 is a view schematically showing the state of flow of an injected resin material when a plate-like multilayered structure resin molded product is molded by setting the gate position at substantially the center of a cavity for forming the plate.

As shown in FIG. 2, the surface layer of a multilayered structure resin molded product is made of the skin layer resin material by first injecting the skin layer resin material and then injecting the core layer resin material. In this embodiment, the aforementioned connecting functional portions are formed at the flow terminal positions of a resin material in a cavity. Therefore, only the skin layer resin material flows to these functional portions.

Figure 11:
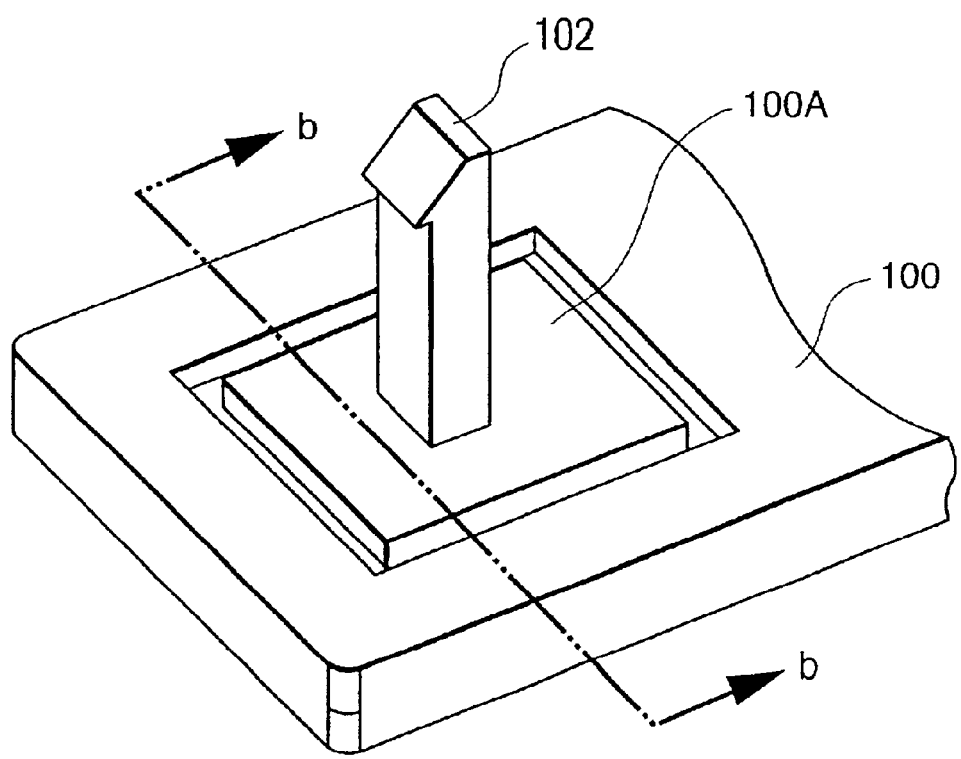
FIG. 11 is a view for explaining another example.

FIGS. 11 and 12 show the structure of a resin molded product 100 for further ensuring the elastic function of the spring projecting portion 102 for achieving the elastic action of the functional portion.

In FIGS. 11 and 12, a groove 100A is formed in a nearby portion around a portion of the plane board 100 from which the spring projecting portion extends. Since this narrows the gap in a cavity portion for forming a flat plate near this groove, the flowability of the core layer resin material lowers. Consequently, only the skin layer resin material flows to the spring projecting portion 102, and inflow of the core layer resin material is prevented.

FIG. 12 is a sectional view taken along a direction b—b in FIG. 11. The inflow amount of the core layer resin material is adjusted by defining a depth t3 of the groove with respect to a thickness T3 of the board 100.

Figure 13:
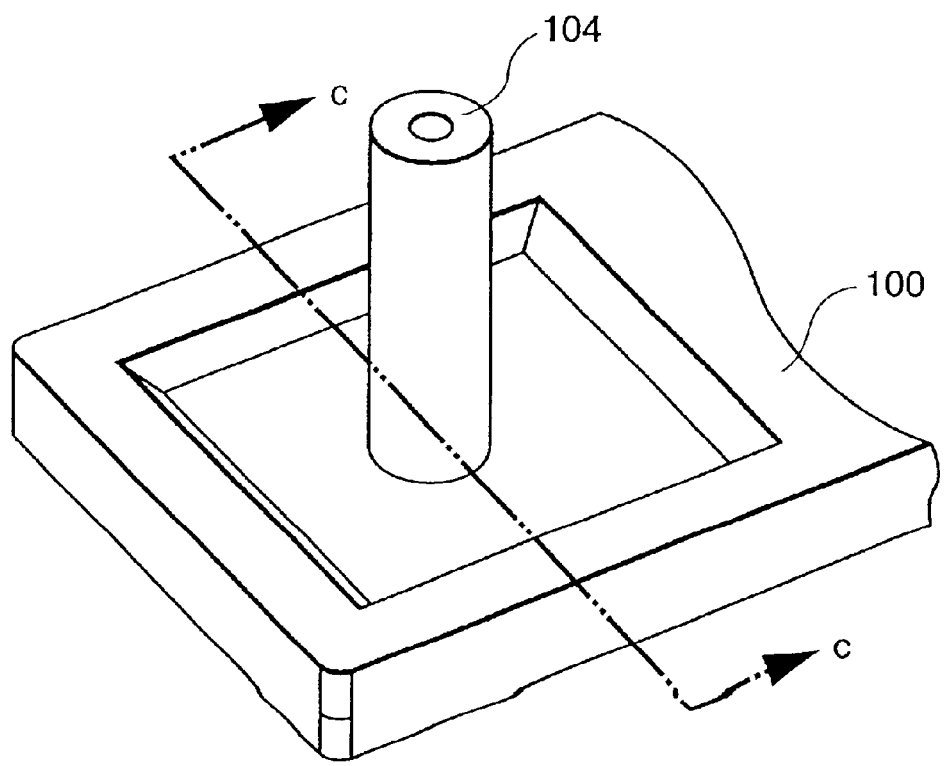
FIG. 13 is a view for explaining still another example.
Figure 14:
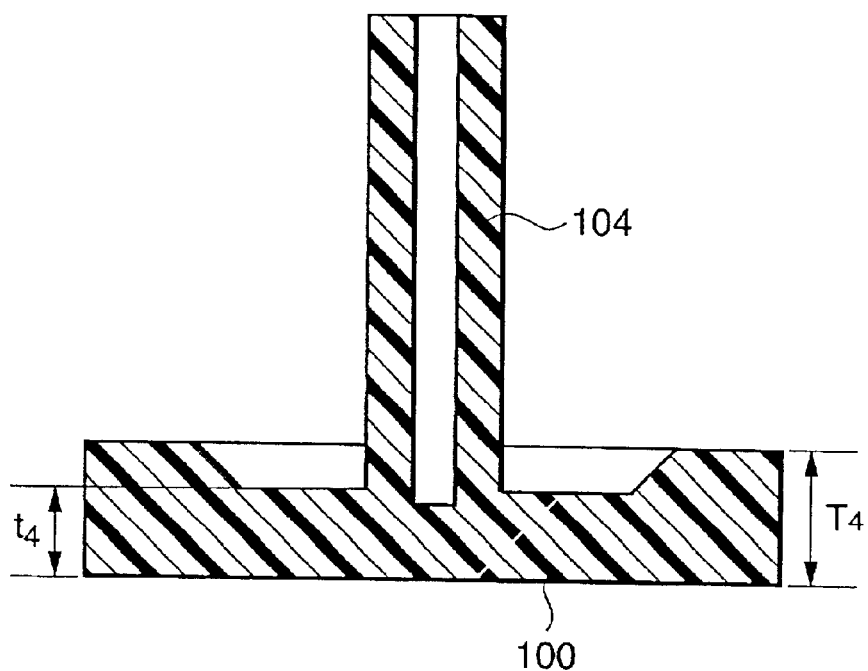
FIG. 14 is a sectional view taken along a direction C—C in FIG. 13.

FIGS. 13 and 14 illustrate the screw connecting portion 104.

To decrease the thickness of a nearby portion around a portion of a plane board from which the screw connecting portion 104 extends, a cavity for forming the board 100 is narrowed to prevent inflow of the core layer resin material. The thickness of the board 100 is represented by T4 and the thickness around the portion of the board 100 from which the screw connecting portion 104 extends is represented by t4.

FIG. 15 shows an example of a self-tap boss 106.

High mechanical strength of screw connection can be assured by molding the boss 106 only with the skin layer resin material.

Especially when a height H2 of the boss 106 was set to be three times a thickness T6 of a board 108 or more, it was possible to prevent inflow of the core layer resin material and form the boss 106 only with the skin layer.

(Third Embodiment)

It is the main purpose of the present invention to reuse a material obtained by pulverizing molded products as a raw material of the core layer resin material, without deteriorating physical property values by repelletization, thereby contributing to the recycling efficiency and environmental resource protection and preventing inconvenience of the external color when a dark-color material is used as the core layer resin.

When a multilayered structure molded product in which a core layer resin molded portion is surrounded by a skin layer resin molded portion is to be formed, if the color of the core layer resin molded portion, particularly the color of the core layer resin material is dark and different in density from the color of the skin layer resin material, this color status appears on the surface in connection with the transmittance of the skin layer resin molded portion. This poses a problem of the external appearance.

This embodiment solves this problem.

The properties of a color have three attributes: hue, saturation, and lightness. Hue is a scale of colors, and saturation is the vividness of color. Products used in this embodiment are business machines such as copying machines and printers. The colors of external parts of these products are controlled to lightness having no influence on the use environment. The products used in this embodiment are whitish.

In this embodiment, internal parts were removed from plastic resin molded products (PC+ABS alloy resin) of copying machines manufactured by CANON and used for two to seven years.

The color of the resin was dark gray.

As in the first embodiment, these internal parts are pulverized and reused as a raw material of the core layer resin material.

As a skin layer resin material, virgin pellets of a PC+ABS alloy resin were molded into the same external part as shown in FIG. 1.

The thickness of a plate is 2.0 mm.

Several portions of each molded product were cut, and each section was observed with a toolmaker's optical microscope.

As a consequence, the thickness of the molded portion made of the skin layer resin material was 0.55 to 0.40 mm. The external color of a 0.40-mm thick portion of the skin layer of this molded product was measured with an integrating-sphere spectrophotometer (CE-7000A) manufactured by Greta Macbeth.

The measurement result represented by the L'a'b' calorimetric system on the basis of JIS Z 8729 was (L', a', b')=(77.59, 0.53, 4.44)

When a portion consisting only of the skin layer resin molded portion was measured, the measurement result was (L', a', b')=(77.72, 0.60, 4.38)

In addition, measurement pieces of other molded portions were measured.

The thickness of the skin layer resin molded portion was 0.48 to 0.30 mm.

The external color of a 0.30-mm thick portion of the skin layer resin molded portion was measured, and the measurement result was (L', a', b')=(77.42, 0.51, 4.24)

Furthermore, the thickness of the skin layer resin portion of molding was decreased to increase the filling amount of the core layer resin material. That is, molding was performed by setting the thickness of the skin layer resin portion to 0.26 to 0.20 mm. Consequently, the color of the resin of the core layer resin material was seen through the surface.

The external color was measured, and the result was (L', a', b')=(71.32, −1.02, 0.35)

In the above embodiments, there is provided a multilayered structure resin molded product comprising a core layer and a skin layer, characterized in that the resin molded product is molded using a pulverized resin material, which is formed by pulverizing a molded product molded from a thermoplastic resin material, as a resin material for forming the core layer, and a virgin material as a resin material for forming the skin layer. This resin molded product allows the reuse of the core layer resin material.

Also, the environmental problems can be solved by using this resin molded product as an external part or housing part of, e.g., an office machine, electric apparatus, or information communication apparatus.

The above embodiments can develop the diversity of the sandwich molding technology by proposing a method of manufacturing a multilayered structure resin molded product comprising a core layer and a skin layer, characterized in that molding is performed by setting molding flowability of a resin material for forming the core layer, which is injected into a cavity of a mold for molding the resin molded product, to be lower than that of a resin material for forming the skin layer.

The above embodiments can avoid the influence of the reuse of a resin material by proposing a method of manufacturing a multilayered structure resin molded product comprising a core layer and a skin layer, characterized in that a pulverized resin material formed by pulverizing a molded product molded from a thermoplastic resin material is used as a resin material for forming the core layer, a virgin material is used as a resin material for forming the skin layer, and molding is performed by setting the resin temperature of the resin material for forming the core layer to be higher than that of the resin material for forming the skin layer.

Also, the utilization efficiency of a recycled resin material can be improved by proposing a method of manufacturing a multilayered structure resin molded product by injecting a resin material for forming a core layer and a resin material for forming a skin layer into a mold, characterized in that after a predetermined volume of the resin material for forming the skin layer is injected, a resin material for forming the core layer, which is obtained by pulverizing a molded product of a resin material, and a virgin resin material for forming the skin layer are simultaneously injected, and the virgin resin material for forming the skin layer is injected again.

Functional applications of a multilayered structure resin molded product can be extended by proposing a multilayered structure resin molded product comprising a core layer and a skin layer, as one of the above embodiments, characterized in that a portion of the resin molded product has a mounting portion for mounting another part, the whole of the resin molded product has a multilayered structure comprising the core layer and the skin layer, and the mounting portion is made of a skin layer resin material.

The present invention is not limited to the above embodiments and various changes and modifications can be made within the spirit and scope of the present invention. Therefore, to apprise the public of the scope of the present invention the following claims are made.

What is claimed is:

1. A multilayered structure resin molded product comprising a core layer and a skin layer, wherein said resin molded product is injection-molded using a pulverized resin material, which is formed by pulverizing a molded product molded from a thermoplastic resin material, as a resin material for forming said core layer, and a virgin material as a resin material for forming said skin layer, and wherein a board-shaped part of the entire said resin molded product has a projecting portion for mounting another part, and said projecting portion is formed integrally with the skin layer only from the same material as the skin layer by setting a thickness of said projecting portion to be smaller than a thickness of the board-shaped part.

2. The product according to claim 1, wherein said projecting portion is a connecting portion having elasticity.

3. The product according to claim 1, wherein said projecting portion is a screw connecting portion.

4. The product according to claim 1, wherein a groove or cavity is formed around said projecting portion of said resin molded product.

5. A multilayered structure resin molded product comprising a core layer and a skin layer, wherein said resin molded product is injection-molded using a pulverized resin material, which is formed by pulverizing a molded product molded from a thermoplastic resin material, as a resin material for forming said core layer, and a virgin material as a resin material for forming said skin layer, and wherein a board-shaped part of the entire said resin molded product has a projecting portion for mounting another part, and said projecting portion is formed integrally with the skin layer only from the same material as the skin layer by setting a height of said projecting portion to be greater than a thickness of the board-shaped portion by a specific value when a thickness of the projecting portion is greater than the thickness of the board-shaped part.

6. The product according to claim 5, wherein said projecting portion is a connecting portion having elasticity.

7. The product according to claim 5, wherein said projecting portion is a screw connecting portion.

8. The product according to claim 5, wherein a groove or cavity is formed around said projecting portion of said resin molded product.

9. A multilayered structure resin molded product comprising a core layer and a skin layer, wherein said resin molded product is injection-molded using a recycled resin material, whose properties have degraded from a virgin material, as a resin material for forming the core layer, and a virgin material as a resin material for forming the skin layer, and wherein a board-shaped part of the entire said resin molded product has a projecting portion for mounting another part, and said projecting portion is formed integrally with the skin layer only from the same material as the skin layer.

10. The product according to claim 9, wherein a groove or cavity is formed around said projecting portion of said resin molded product.

* * * * *